United States Patent
Zhao et al.

(10) Patent No.: US 11,469,618 B2
(45) Date of Patent: Oct. 11, 2022

(54) MULTILEVEL SWITCHED-CAPACITOR AC-DC RECTIFIER FOR WIRELESS CHARGING WITH POWER REGULATION

(71) Applicants: Futurewei Technologies, Inc., Plano, TX (US); University of Tennessee Research Foundation, Knoxville, TN (US)

(72) Inventors: Chongwen Zhao, Knoxville, TN (US); Daniel Costinett, Knoxville, TX (US); Songnan Yang, Frisco, TX (US)

(73) Assignees: Futurewei Technologies, Inc., Addison, TX (US); University of Tennessee Research Foundation, Knoxville, TN (US)

( * ) Notice: Subject to any disclaimer, the term of this patent is extended or adjusted under 35 U.S.C. 154(b) by 92 days.

(21) Appl. No.: 17/073,593

(22) Filed: Oct. 19, 2020

(65) Prior Publication Data

US 2021/0057934 A1 Feb. 25, 2021

Related U.S. Application Data

(63) Continuation of application No. PCT/US2019/034891, filed on May 31, 2019.
(Continued)

(51) Int. Cl.
*H02J 50/12* (2016.01)
*H02M 7/04* (2006.01)
(Continued)

(52) U.S. Cl.
CPC .............. *H02J 50/12* (2016.02); *H02M 1/08* (2013.01); *H02M 7/05* (2021.05); *H02M 1/0016* (2021.05); *H02M 1/12* (2013.01)

(58) Field of Classification Search
CPC .. H02M 7/05; H02M 1/12; H02M 1/08; H02J 50/12
See application file for complete search history.

(56) References Cited

U.S. PATENT DOCUMENTS 9,762,134 B2 9/2017 Deboy et al.
10,044,228 B2 8/2018 Sankar
(Continued)

FOREIGN PATENT DOCUMENTS

DE 102015115037 A1 3/2016

OTHER PUBLICATIONS

Examination Report dated Dec. 22, 2021, Indian Patent Application No. 202037504984.
(Continued)

*Primary Examiner* — Alex Torres-Rivera
(74) *Attorney, Agent, or Firm* — Vierra Magen Marcus LLP

(57) ABSTRACT

Described herein is a wireless charging system including switched capacitor (SC) rectifiers with output regulation. The load for the receiver on mobile devices using wireless charging is a battery. Regulation is needed for battery charging applications, e.g. constant voltage charging, constant current charging, and pulsed charging. For this purpose, the wireless power transfer (WPT) receiver can possess some "intelligence" to monitor the output voltage/current, adjust the behavior of the electronic circuitries and achieve a closed-loop control. Because a multilevel switched-capacitor (MSC) rectifier has output control ability, this can allow the MSC rectifier to directly charge the battery without an additional DC/DC charger on-board the device.

17 Claims, 13 Drawing Sheets

Related U.S. Application Data

(60) Provisional application No. 62/679,577, filed on Jun. 1, 2018.

(51) Int. Cl.
*H02M 1/08* (2006.01)
*H02M 1/12* (2006.01)
*H02M 1/00* (2006.01)

(56) References Cited

U.S. PATENT DOCUMENTS

| | | | |
|---|---|---|---|
| 2013/0099590 A1* | 4/2013 | Ma | H02M 3/3388 307/104 |
| 2014/0233279 A1 | 8/2014 | Ryota et al. | |
| 2016/0261205 A1* | 9/2016 | Kolar | H02M 1/32 |
| 2017/0040846 A1 | 2/2017 | Ganapathy | |
| 2020/0052575 A1* | 2/2020 | Wang | H02M 1/12 |

OTHER PUBLICATIONS

International Search Report & The Written Opinion of the International Searching Authority dated Sep. 11, 2019, International Application No. PCT/US2019/034891.

English Abstract of DE Publication No. 102015115037 published Mar. 10, 2016.

* cited by examiner

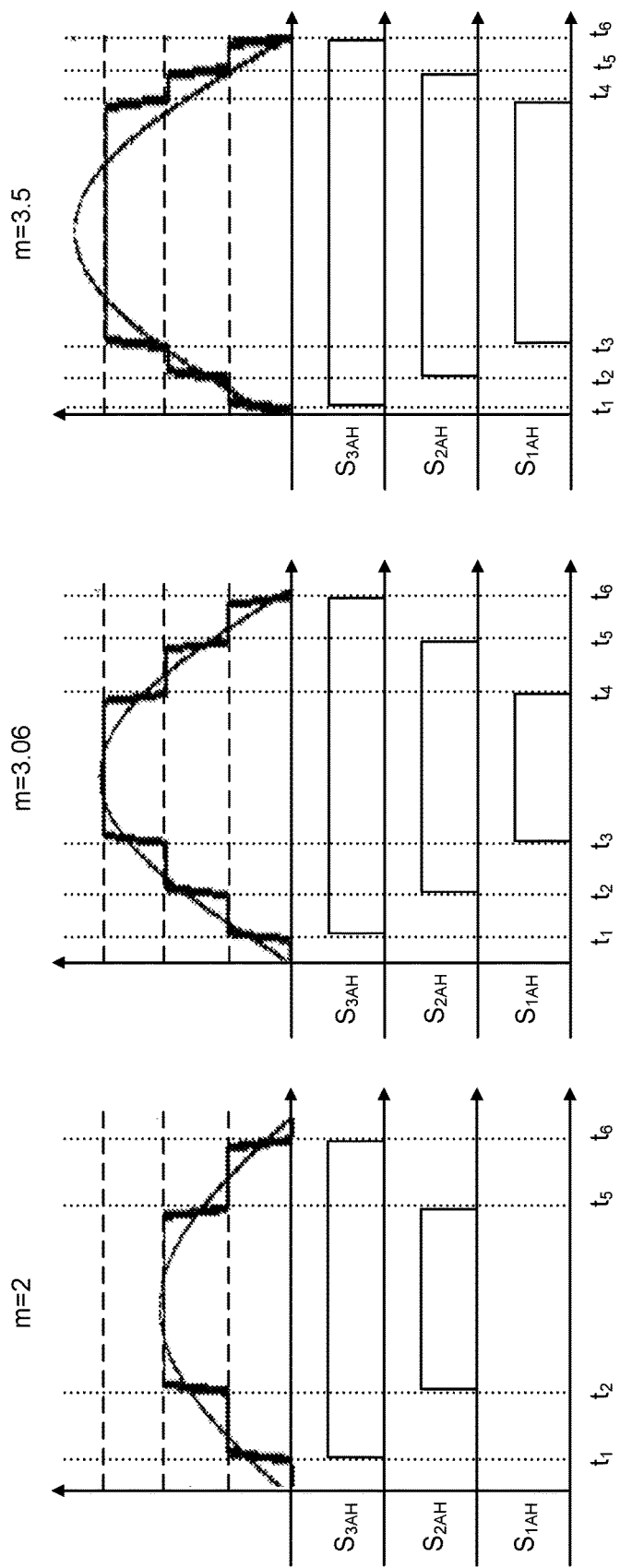

MULTILEVEL SWITCHED-CAPACITOR AC-DC RECTIFIER FOR WIRELESS CHARGING WITH POWER REGULATION

CROSS-REFERENCE TO RELATED APPLICATIONS

This application is a continuation of PCT Patent Application No. PCT/US19/34891, entitled, "MULTILEVEL SWITCHED-CAPACITOR AC-DC RECTIFIER FOR WIRELESS CHARGING WITH POWER REGULATION," filed May 31, 2019 by Zhao et al., which claims priority to U.S. Provisional Patent Application No. 62/679,577, entitled "MULTILEVEL SWITCHED-CAPACITOR AC-DC RECTIFIER FOR WIRELESS CHARGING WITH POWER REGULATION," by Zhao et al., filed Jun. 1, 2018, both of which are incorporated by reference herein in their entirety.

The present application claims priority from U.S. Provisional Patent Application No. 62/679,577, entitled "MULTILEVEL SWITCHED-CAPACITOR AC-DC RECTIFIER FOR WIRELESS CHARGING WITH POWER REGULATION," by Zhao et al., filed Jun. 1, 2018, incorporated by reference herein in its entirety.

TECHNICAL FIELD

The disclosure generally relates to wireless battery charging systems and methods for use therewith.

BACKGROUND

Consumer mobile electronics have become prolific in daily lives. Computation capabilities, communication speeds, and display resolutions of smartphones, tablets, and personal computers have gradually increased, resulting in power demand approaching the daily energy limit of modern mobile battery technologies. To decrease the impact of periodic recharging, fast charging technology has been proposed and adopted by many manufacturers, with commercial devices supporting wired charging in excess of 20 W. Concurrently, wireless power transfer has been developed in recent years, with commercial wireless chargers integrated into many products, though predominately at reduced (e.g., 5-10 W) power levels.

In a typical Wireless Power Transfer (WPT) architecture, a transmitter converts a Direct Current (DC) voltage to an Alternating Current (AC) waveform, feeding a pair of magnetically coupled coils. When two coils are loosely coupled in a WPT system, capacitors compensate for their uncoupled inductive impedance, improving active power transfer efficiency. The WPT receiver, commonly a diode full bridge, rectifies the AC voltage to a DC voltage for driving the load, typically including a battery to be changed.

On the receiving side, a typically mobile device includes the receiving coil, a compensation network, and a rectifier. This results in several design constraints for the system: high power density and low-profile components are required due to space constraints; high AC-DC conversion efficiency is required due to fast charging speed power levels and limited heat dissipation capability; and the system must generate minimal harmonic content to meet ElectroMagnetic Interference (EMI) and WPT standards and minimize interference for sensitive electronics. These constraints limit the feasible design options for the system, as small and low-profile magnetics and WPT coils are often prohibitively lossy.

Common WPT structures, however, lead to challenges when adopting 20 W fast charging. With a typical output voltage for the load of 5 V, a diode rectifier and receiver coil will conduct a sinusoidal current with a peak greater than 4 amps when delivering 20 W. For a standard commercial receiver coil with Q=120 and L=20 pH, this will result in 2.5 W of conduction loss on the coil, and a roughly equal loss due to diode conduction, degrading efficiency and potentially resulting in overheating issues. Furthermore, an input voltage for the diode rectifier of a square waveform will contain considerable $3^{rd}$ and $5^{th}$ order harmonics. Also, parasitics and nonlinearities of diode switching result in harmonic generation and additional reactive power. This requires extra passive filters, apart from compensation capacitors, to comply with WPT band limitation and electromagnetic compatibility, resulting in increased volume and loss on the receiver in practice.

SUMMARY

According to a first aspect of the present disclosure, an apparatus for regulating a rectifier circuit includes a compensator and a modulator. The compensator is configured to receive a comparison of an output of the rectifier circuit with a reference level and generate a modulation index from the comparison. The modulator is configured to receive the modulation index and generate timings for a plurality of controls signals of switches in the MSC rectifier corresponding to the modulation index.

Optionally, in a second aspect and in furtherance of the first aspect, the modulator is further configured to: generate the timing for control signal of MSC rectifier circuit corresponding to a modulation index from one or more reference voltage levels and a reference waveform; generate a plurality of modulated direct current (DC) voltage levels from the modulation index and the one or more reference voltages; and generate a corresponding plurality of control signals by a comparison of the modulated DC voltage levels and the reference waveform.

Optionally, in a third aspect and in furtherance of the second aspect, the apparatus further includes a gain sensor and a comparator. The gain sensor is configured to receive the output of the rectifier circuit and generate therefrom an indication of an output level. The comparator is configured to receive the indication of the output level and the reference level and generate an error value from a difference between the indication of the output level and the reference level. The compensator includes an integrator configured to receive the error value and generate therefrom the modulation index as an accumulated error value.

Optionally, in a fourth aspect and in furtherance of the third aspect, the apparatus further includes the modulated DC voltage levels have amplitudes dependent upon the accumulated error value.

Optionally, in a fifth aspect and in furtherance of any of the third and fourth aspects, the apparatus further includes a limiter configured to receive and limit a range of the accumulated error value and to supply the error value to the modulator as a range limited accumulated error value.

Optionally, in a sixth aspect and in furtherance of any of the third to fifth aspects, the apparatus further includes a feedforward circuit configured to receive the accumulated error value and a feedforward parameter and provide the error value to the modulator as an accelerated accumulated error value.

Optionally, in a seventh aspect and in furtherance of any of the third to sixth aspects, the gain sensor is configured to receive the output of the rectifier circuit as an output voltage level.

Optionally, in an eighth aspect and in furtherance of the seventh aspect the gain sensor includes a voltage divider configured to receive and divide the output voltage level and an analog to digital converter configured to receive the divided output voltage level and supply the indication of the output level as a digital value.

Optionally, in a ninth aspect and in furtherance of any of the preceding aspects, the number of the plurality of modulated DC voltage levels is three.

Optionally, in a tenth aspect and in furtherance of any of the preceding aspects, the reference waveform is a reference sine wave.

Optionally, in an eleventh aspect and in furtherance of the tenth aspect, the modulator is configured to generate a timing of each of the control signals by comparison of an amplitude of the corresponding modulated DC voltage level with the reference sine wave.

Optionally, in an twelfth aspect and in furtherance of the eleventh aspect, the modulator includes a plurality of comparators each figured to receive the reference sine wave and a corresponding one of the corresponding modulated DC voltage levels and to provide one of the control signal as an output of the corresponding comparator.

According to another aspect of the present disclosure, a method for wirelessly receiving power includes rectifying a received power waveform using a multilevel switched-capacitor (MSC) rectifier to generate an output voltage in response to a plurality of control signals and generating the plurality of control signals. Generating the plurality of control signals includes: receiving the output voltage; performing a comparison of the output voltage to a reference value; generating a modulation index based on the comparison; and generating a timing for each of the plurality of control signals based on the modulation index.

According to another aspect of the present disclosure, a regulated rectifier system includes a multilevel switched-capacitor (MSC) rectifier circuit and a regulation circuit. The multilevel switched-capacitor (MSC) rectifier circuit is configured to receive an input waveform and a plurality of control signals and to generate an output for driving a load from the input waveform in response to the plurality of control signals. The regulation circuit is configured to receive the output of the rectifier circuit, determine a modulation index from a comparison of the output of the rectifier circuit with a reference level, generate a corresponding plurality of the control signals from the modulation index.

According to a further aspect of the present disclosure, a rectifier circuit for generating a multilevel output waveform from an input waveform in response to a plurality of control signals includes a first leg connected between an input node and an output node and a second leg first leg connected between the input node and the output node. The first leg includes a plurality of first capacitors and a plurality of first switches configured to receive a first plurality of the control signals. The first switches are configured to connect the input waveform received at the input node to the output node through a number of the first capacitors connected in series that is dependent on a corresponding number of the first plurality of the control signals that are asserted to generate the multilevel output waveform at the output node during a first half-cycle. The second leg includes a plurality of second capacitors and a plurality of second switches configured to receive a second plurality of the control signals. The second switches are configured to connect the input waveform received at the input node to the output node through a number of the second capacitors connected in series that is dependent on a corresponding number of the second plurality of the control signals that are asserted to generate the multilevel output waveform at the output node during a second half-cycle.

Embodiments of the present technology described herein provide improvements to existing wireless power transfer (WPT) systems through use of a multilevel switched-capacitor (MSC) rectifier with output regulation. The WPT receiver possess some "intelligence" to monitor the output voltage/current, adjust the behavior of the electronic circuitries and achieve a closed-loop control. Because the MSC rectifier has output control ability, it can directly charge the battery without an additional DC/DC charger on-board.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIGS. 7A-7C illustrate rectifier input waveforms and gate signals at various modulation indices.

DETAILED DESCRIPTION

The present disclosure will now be described with reference to the figures, which in general relate to wireless battery charging systems for wirelessly charging a rechargeable battery of an electronic device that includes a load powered by the battery, and methods for use therewith.

More specifically, the following presents embodiments of switched capacitor (SC) rectifiers with output regulation. The load for the receiver on mobile devices using wireless charging is a battery. Regulation is needed for battery charging applications, e.g. constant voltage charging, constant current charging, and pulsed charging. For this purpose, the WPT receiver can possess some "intelligence" to monitor the output voltage/current, adjust the behavior of the electronic circuitries and achieve a closed-loop control. Because a multilevel switched-capacitor (MSC) rectifier has output control ability, this can allow the MSC rectifier to directly charge the battery without an additional DC/DC charger on-board the device.

As discussed in the background, high conduction loss on miniaturized AC-DC rectifiers and coils can be a barrier to wireless fast charging. The described embodiments of MSC rectifiers feature a multilevel design with good scalability to accommodate different power ratings and load ranges. Due to the step-down conversion ratio, currents throughout the system are reduced, resulting in a substantial reduction of conduction losses on the transmitter, receiver, and WPT coils. Furthermore, the multilevel waveform improves the harmonic content at the rectifier input compared with a traditional diode-bridge rectifier. Consequently, the designs presented here are suitable for high efficiency and low harmonic content wireless charging applications.

Figure 1:
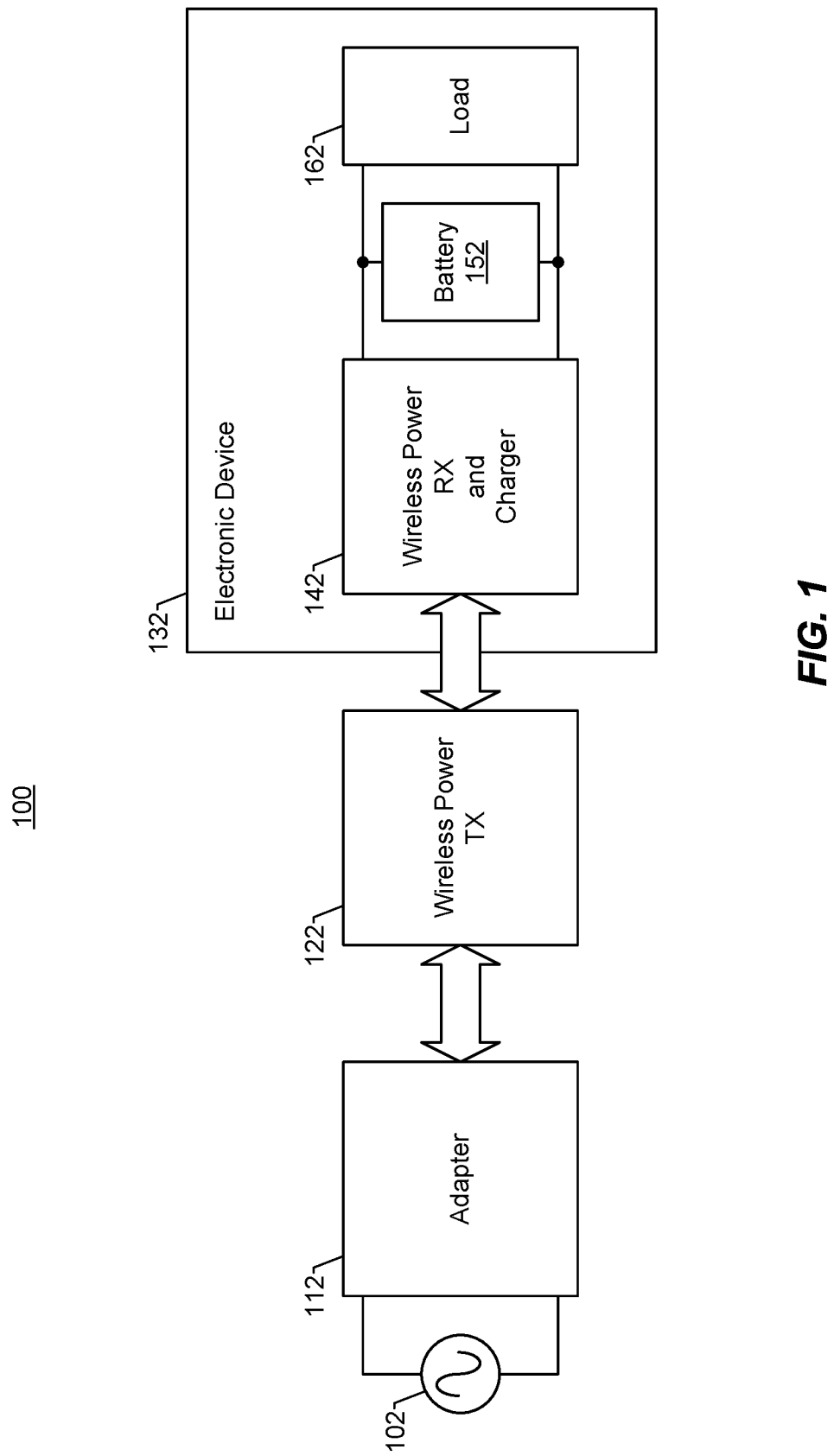
FIG. 1 illustrates an example wireless battery charging system.

FIG. 1 illustrates an example wireless battery charging system 100, which can be a Qi-standard wireless battery charging system, for example, but is not limited thereto. The Qi-standard is an open interface standard developed by the Wireless Power Consortium (WPC) that defines wireless power transfer using inductive charging over distances of a few mm. A Qi-standard wireless battery charging system typically uses a charging pad and a compatible battery powered device, which is placed on top of the pad, charging via resonant inductive coupling.

Referring to FIG. 1, the example wireless battery charging system 100 is shown as including an adaptor 112, a wireless power transmitter (TX) 122, and a wireless power receiver (RX) and charger 142. As can be appreciated from FIG. 1, the wireless power RX and charger 142 is shown as being part of an electronic device 132 that also includes a rechargeable battery 152 and a load 162 that is powered by the battery 152. Since the electronic device 132 is powered by a battery, the electronic device 132 can also be referred to as a battery-powered device 132. The load 162 can include, e.g., one or more processors, displays, transceivers, and/or the like, depending upon the type of the electronic device 132. The electronic device 132 can be, for example, a mobile smartphone, a tablet computer, or a notebook computer, but is not limited thereto. The battery 152, e.g., a lithium ion battery, can include one or more electrochemical cells with external connections provided to power the load 162 of the electronic device 132.

The adaptor 112 converts an alternating current (AC) voltage, received from an AC power supply 102, into a direct current (DC) input voltage (Vin). The AC power supply 102 can be provided by a wall socket or outlet or by a power generator, but is not limited thereto. The wireless power TX 122 accepts the input voltage (Vin) from the adaptor 112 and in dependence thereon transmits power wirelessly to the wireless power RX and charger 142. The wireless power TX 122 can be electrically coupled to the adaptor 112 via a cable that includes a plurality of wires, one or more of which can be used to provide the input voltage (Vin) from the adaptor 112 to the wireless power TX 122, and one or more of which can provide a communication channel between the adaptor 112 and the wireless power TX 122. The communication channel can allow for wired bi-directional communication between the adaptor 112 and the wireless power TX 122. The cable that electrically couples the adaptor 112 to the wireless power TX 122 can include a ground wire that provides for a common ground (GND). The cable between the adaptor 112 and the wireless power TX 122 is generally represented in FIG. 1 by a double-sided arrow extending between the adaptor 112 and the wireless power TX 122. Such a cable can be, e.g., a universal serial bus (USB) cable, but is not limited thereto.

The wireless power RX and charger 142, via an inductive coupling, receives power wirelessly from the wireless power TX 122 and uses the received power to charge the battery 152. The wireless power RX and charger 142 can also wirelessly communicate bi-directionally with the wireless power TX 122, such as by using in-band communications defined by the Qi standard. In FIG. 1 a double-sided arrow extending between the wireless power TX 122 and the wireless power RX and charger 142 is used to generally represent the wireless transfer of power and communications therebetween.

Figure 2:
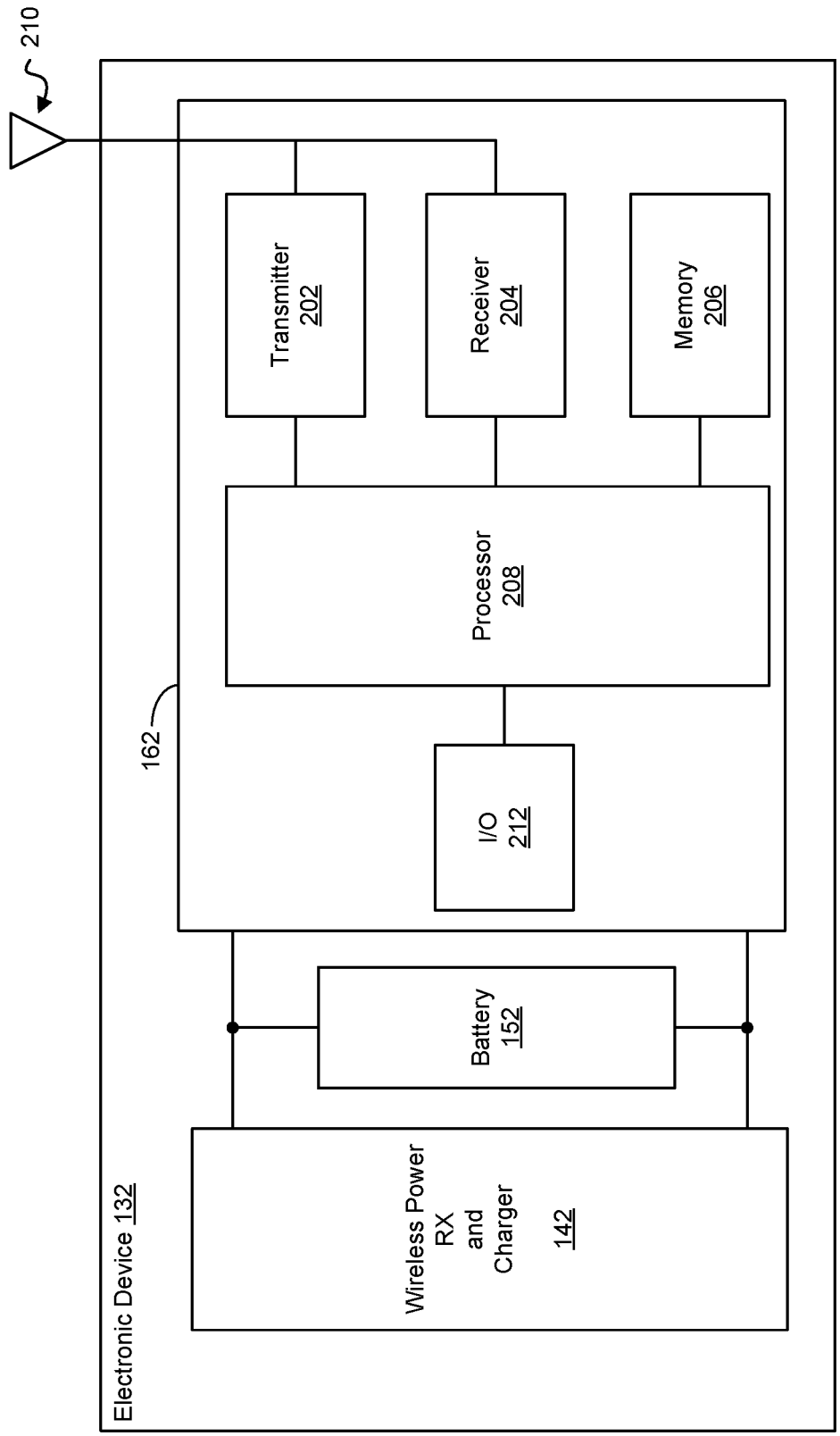
FIG. 2 illustrates example details of an electronic device that may implement the methods and teachings according to this disclosure.

FIG. 2 is an example electronic device 132 in which embodiments may be practiced. The electronic device 132 may for example be a wireless electronic device (e.g., mobile telephone), but may be other devices in further examples such as a desktop computer, laptop computer, tablet, hand-held computing device, automobile computing device and/or other computing devices. As shown in FIG. 2, the electronic device 132 is shown as including a load 162 comprising various electronic components, which include at least one transmitter 202, at least one receiver 204, memory 206, at least one processor 208, and at least one input/output device 212. The processor 208 can implement various processing operations of the electronic device 132. For example, the processor 208 can perform signal coding, data processing, power control, input/output processing, or any other functionality enabling the electronic device 132 to operate. The processor 208 may include any suitable processing or computing device configured to perform one or more operations. For example, the processor 208 may include a microprocessor, microcontroller, digital signal processor, field programmable gate array, or application specific integrated circuit.

The transmitter 202 can be configured to modulate data or other content for transmission by at least one antenna 210. The transmitter 202 can also be configured to amplify, filter and a frequency convert RF signals before such signals are provided to the antenna 210 for transmission. The transmitter 202 can include any suitable structure for generating signals for wireless transmission.

The receiver 204 can be configured to demodulate data or other content received by the at least one antenna 210. The receiver 204 can also be configured to amplify, filter and frequency convert RF signals received via the antenna 210. The receiver 204 is an RF signal receiver, in some embodiments. The receiver 204 can include any suitable structure for processing signals received wirelessly. The antenna 210 can include any suitable structure for transmitting and/or receiving wireless signals. The same antenna 210 can be used for both transmitting and receiving RF signals, or alternatively, different antennas 210 can be used for transmitting signals and receiving signals.

It is appreciated that one or multiple transmitters 202 could be used in the electronic device 132, one or multiple receivers 204 could be used in the electronic device 132, and one or multiple antennas 210 could be used in the electronic device 132. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown.

The electronic device 132 further includes one or more input/output devices 212. The input/output devices 212 facilitate interaction with a user. Each input/output device 212 includes any suitable structure for providing information to or receiving information from a user, such as a speaker, microphone, keypad, keyboard, display, or touch screen.

In addition, the electronic device 132 includes at least one memory 206. The memory 206 stores instructions and data used, generated, or collected by the electronic device 132. For example, the memory 206 could store software or firmware instructions executed by the processor(s) 208 and data used to reduce or eliminate interference in incoming signals. Each memory 206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

During charging of the battery 152 by the wireless power RX and charger 142, the load 162 may draw transient currents. These transient currents could be provided by the battery 152 and/or the wireless power RX and charger 142. When charging the battery 152, the wireless power RX and charger 142 may communicate with the wireless power TX 122. More specifically, the wireless power RX and charger 142 may use the receiver coil L2 to send information to the wireless power TX 122 using an in-band communication channel.

Figure 3:
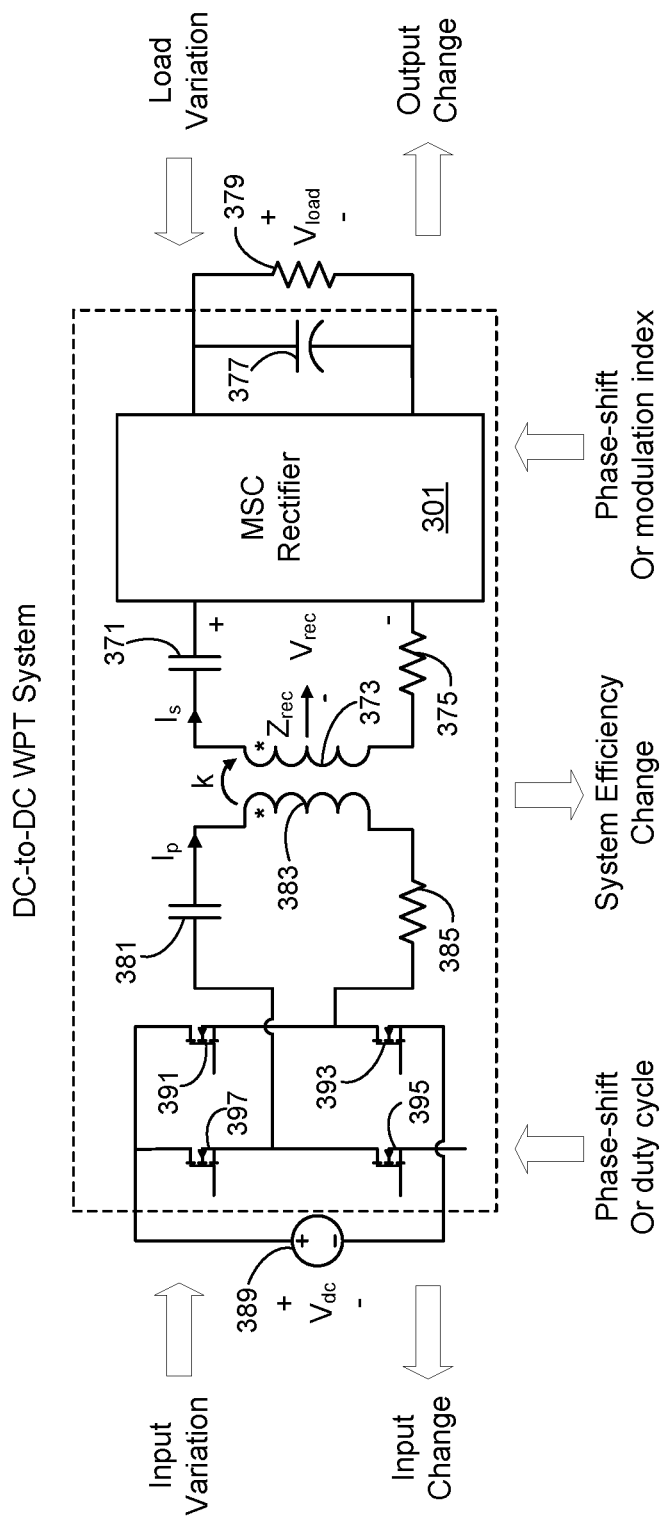
FIG. 3 is a block diagram for one embodiment of output regulation with an MSC rectifier, along with some of the inputs and outputs affecting the system's operation.

FIG. 3 is a block diagram for one embodiment of output regulation with a multilevel switched-capacitor (MSC) rectifier, along with some of the inputs and outputs affecting the system's operation. More specifically, FIG. 3 illustrates elements of both the transmitter and receiver sides of a DC-to-DC wireless power transfer system. In this example, on the transmitter side a voltage source $V_{dc}$ 389 is connected across a full-bridge inverter (formed of switches 391, 393, 395 and 397) that is in turn connected to a resonant tank formed of capacitor 381, inductor 383, and resistor 385.

On the receiver side, in addition to the resonant tank of capacitor 371, inductor 373, and resistor 375, the receiver includes an MSC rectifier 301 connected to receive the AC waveform from receiver side resonant tank. The impedance of the MSC rectifier is represented as $Z_{rec}$. The MSC rectifier 301 rectifies the AC waveform to supply the voltage $V_{load}$ across the output capacitor 377 and to the load (such as battery 152 and other components 162 of the device) represented as the resistance 379. For the transfer of power, the coil of transmitter side inductor 383 is coupled with the coil of the receiver side inductor 373 on the WPT receiver side, where the coupling constant is represented as k. The current $I_p$ through the coil of inductor 383 will induce a current $I_s$ in the coil of inductor 373 to form the resonant link conversion system.

Some of the DC-to-DC WPT system's external disturbances are represented in FIG. 3 by the arrows around the system and include the variations of the input voltage and load. On the transmitter side, input variations, such as a change in the $V_{dc}$ level, lead to input changes, where this can be regulated by changes in phase or duty cycle, for example, in the control signals for the switches 391, 393, 395, and 397 of the transmitter's bridge. On the receiver side, variations in the load, such as due to use of the components on the device or the state of the battery, lead to output changes that can be regulated by a phase-shift or changes in a modulation index, as discussed more in the following. Other disturbances can come from a system efficiency change, such as due to changing the relation of the coils of inductors 383 and 373 leading to a change in the coupling constant k.

A common approach for DC-to-DC WPT systems is, rather than the MSC rectifier 301 embodiments described below, to use a diode rectifier followed by a DC/DC conversion stage between the diode rectifier and the load. Since the currents $I_p$ and $I_s$ are major contributing factors to the high conduction loss, increasing the receiver input voltage $V_{rec}$ is an effective approach to reduce the coil current magnitudes while delivering the same amount of power. In this way, the load voltage $V_{load}$ is stepped down from a via a DC/DC converter, such as a buck or buck-boost converter. In consequence, the rectifier input impedance, $Z_{rec}$, is equivalently increased. However, the needed bulky magnetic components introduce a barrier to integration for mobile devices. Moreover, the input impedance of a buck converter follows $Z_{rec,1} \propto 1/d^2$, where d is the duty ratio. The higher impedance it offers to the rectifier stage, the higher voltage stress it will cause on the inductor in the DC/DC converter stage, and therefore it may lead to larger inductor volume and high core loss, which could counteract the reduction in conduction loss.

Considering that capacitors have a higher energy density than magnetic components, a switched-capacitor DC/DC converter (SCC) can achieve a high power-density design with the voltage step-down ability, which makes them advantageous for a power management system-on-chip (SoC) application. A variety of SCCs topologies are extensively studied, and several topologies (Ladder, Cockcroft-Walton, Fibonacci, Dickson, etc.), can implement a DC/DC converter stage with different design trade-offs; however, the input voltage waveform, $V_{rec}$, of a two-level rectifier still contains considerable low-order harmonics, and as the harmonic content increases, the step-down ratio increases the input voltage $V_{rec}$ to reduce the conduction loss. Furthermore, the full-bridge rectifier may suffer from excessive dv/dt transitions due to the raised voltage magnitude, and this high dV/dt on a two-level rectifier may result in electromagnetic interference (EMI) issues.

To address these problems, the embodiment of FIG. 3 uses a multilevel switched-capacitor (MSC) AC-DC rectifier 301. Instead of a conventional full-bridge AC-DC rectifier plus a step-down DC/DC converter in the receiver, these embodiments merge the two stages. The MSC rectifier 301 not only serves as a low-harmonic-content AC-DC rectifier with fewer passive filters, but also provides an efficient voltage step-down conversion to interface a low voltage charging circuit.

To maintain the output voltage $V_{load}$ or output current at desired operation points, the WPT system of FIG. 3 can use control variables, such as a modulation index m of the MSC rectifier 301, and a phase shift or a duty cycle of the transmitter's inverter, to regulate. At the same time, the input and the output power, or the system efficiency, maintains or changes accordingly.

The modulation index m of an MSC rectifier can be defined according to the input and output voltage relationship of the MSC rectifier:

$$m = \frac{V_{rect(fund)}}{V_{load}}$$

where $V_{rect(fund)}$ refers to the peak value of the fundamental component in a multilevel staircase waveform, and $V_{load}$ is the output dc voltage of the MSC rectifier. Essentially, with different modulation index values, the ratio between the fundamental component of input voltage wave form and the output voltage changes, allowing such that the same output voltage $V_{load}$ to be generated from input waveform with different peak voltage due to difference in modulation index m. Similarly, with the same peak voltage applied to the MSC rectifier, with a different modulation index m, the output voltage $V_{load}$ could be different too. The circuit topology and method to adjust the modulation index is discussed in detail in descriptions of FIGS. 4-11.

Figure 4:
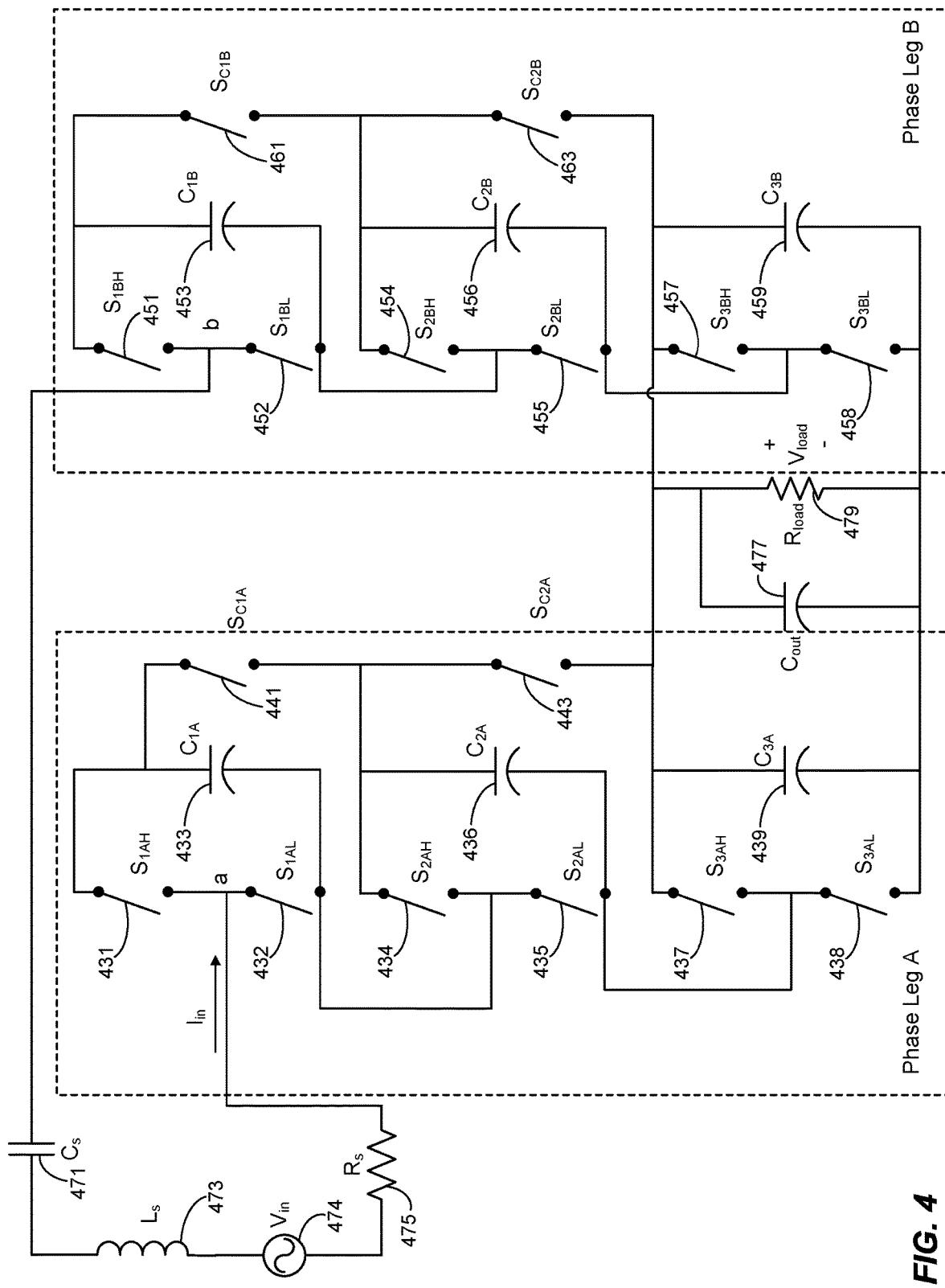
FIG. 4 is a s schematic circuit of a 7-level embodiment for the SC rectifier.
Figure 5:
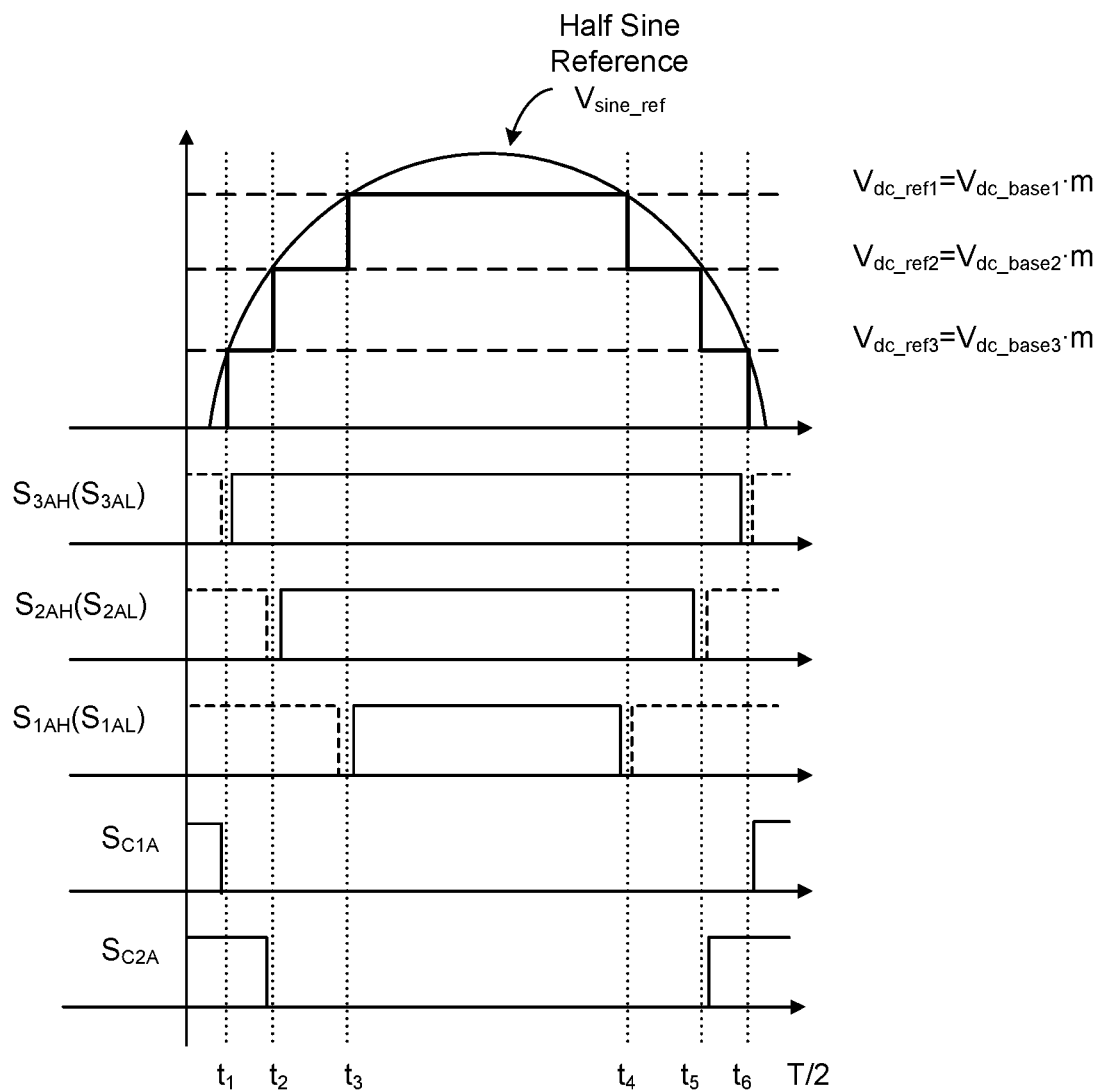
FIG. 5 is a gate control signal diagram for the switches in MSC rectifier of FIG. 4.

FIG. 4 is a circuit schematic of a 7-level embodiment SC rectifier, where other embodiments can use fewer or greater numbers of levels by using a smaller or larger number of switched capacitor stages in each leg. FIG. 5 is a gate signal diagram for the switches in MSC rectifier of FIG. 4.

FIG. 4 illustrates an embodiment of a 7-level switched-capacitor AC-DC rectifier topology for WPT rectification applications, which provides benefits for harmonic content reduction and efficiency improvement. An AC voltage source $V_{in}$ 474 represents the voltage coupled to the receiver coil from the transmitter. Two passive components $L_s$ 473 and $C_s$ 471 are the coil inductance and the compensation capacitance, respectively, and $R_s$ 475 is the parasitic resistance of the coil $L_s$ 473 and compensation capacitor $C_s$ 471.

The topology of FIG. 4 forms a single-phase rectifier with two identical legs, Phase Leg A and Phase Leg B, operated symmetrically with 180° phase shift synchronized to the zero-crossings of $V_{in}$ to drive the load represented as $R_{load}$ 479 and the output capacitor $C_{out}$ 477. The circuit composition and control signal sequence of the two legs are the same, so only the positive half-cycle of $V_{in}$ will be discussed in detail. All devices in the rectifier switch once per period of the AC input, and switching devices in a half bridge configuration, such as $S_{1AH}$ 431 and $S_{1AL}$ 432, operate complementarily. The input terminals, a and b, of the 7-level SC rectifier connect to the receiver resonant tank of $L_s$ 473, $C_s$ 471, and $R_s$ 475, where the differential voltage $V_{ab}$ is a multilevel staircase waveform, instead of a two-level square wave. Therefore, the low-order harmonic magnitudes are expected to be smaller than those in a square wave of the same fundamental amplitude.

Looking at Phase leg A (Phase leg B), each of the flying capacitors $C_{1A}$ 433 ($C_{1B}$ 453), $C_{2A}$ 436 ($C_{2B}$ 456), and $C_{3A}$ 439 ($C_{3B}$ 459) are connectable in series or to be bypassed through use of respective high side switches $S_{1AH}$ 431 ($S_{1BH}$ 451), $S_{2AH}$ 434 ($S_{2BH}$ 454), $S_{3AH}$ 437 ($S_{3BH}$ 457) and respective low side switches $S_{1AL}$ 432 ($S_{1BL}$ 452), $S_{2AL}$ 435 ($S_{2BL}$ 455), and $S_{3AL}$ 438 ($S_{3BL}$ 458). The upper plates of the flying capacitors are also connectable by way of change sharing switches $S_{C1A}$ 441 ($S_{C1B}$ 461) and $S_{C2A}$ 443 ($S_{C2B}$ 463). By selectively opening and closing these switches based on the waveforms illustrated with respect to FIG. 5, the multi-level waveform can be generated, where the equivalent circuits for different subintervals are illustrated in FIGS. 6A-6D. The illustrated embodiment uses three capacitors in each phase leg for a 7-level waveform, but more general the discussion can be extended to N capacitors for generating a (2N+1)-level waveform. The 7-level embodiment is illustrated as this provides a good balance between complexity and suppression of lower order harmonics (here, 3rd and 5th order) that is suitable for many applications.

FIG. 5 illustrates an embodiment of the control signals for switching devices in Phase Leg A and how the timing of these signals is generated in response to a parameter of modulation index m, whose generation is discussed further with respect to FIGS. 9-11 below. The shown control signal sequence is for a 7-level SC rectifier in one input half-period when Phase leg A is active. For each gate signal, the solid line represents the signals for the high side switches and charge sharing switches ($S_{1AH}$ 431, $S_{2AH}$ 434, $S_{3AH}$ 437, $S_{C1A}$ 441, $S_{C2A}$ 443); and dashed line represents the non-overlapping signals for the corresponding low side switches ($S_{1AL}$ 432, $S_{2AL}$ 435, $S_{3AL}$ 438).

Figure 9:
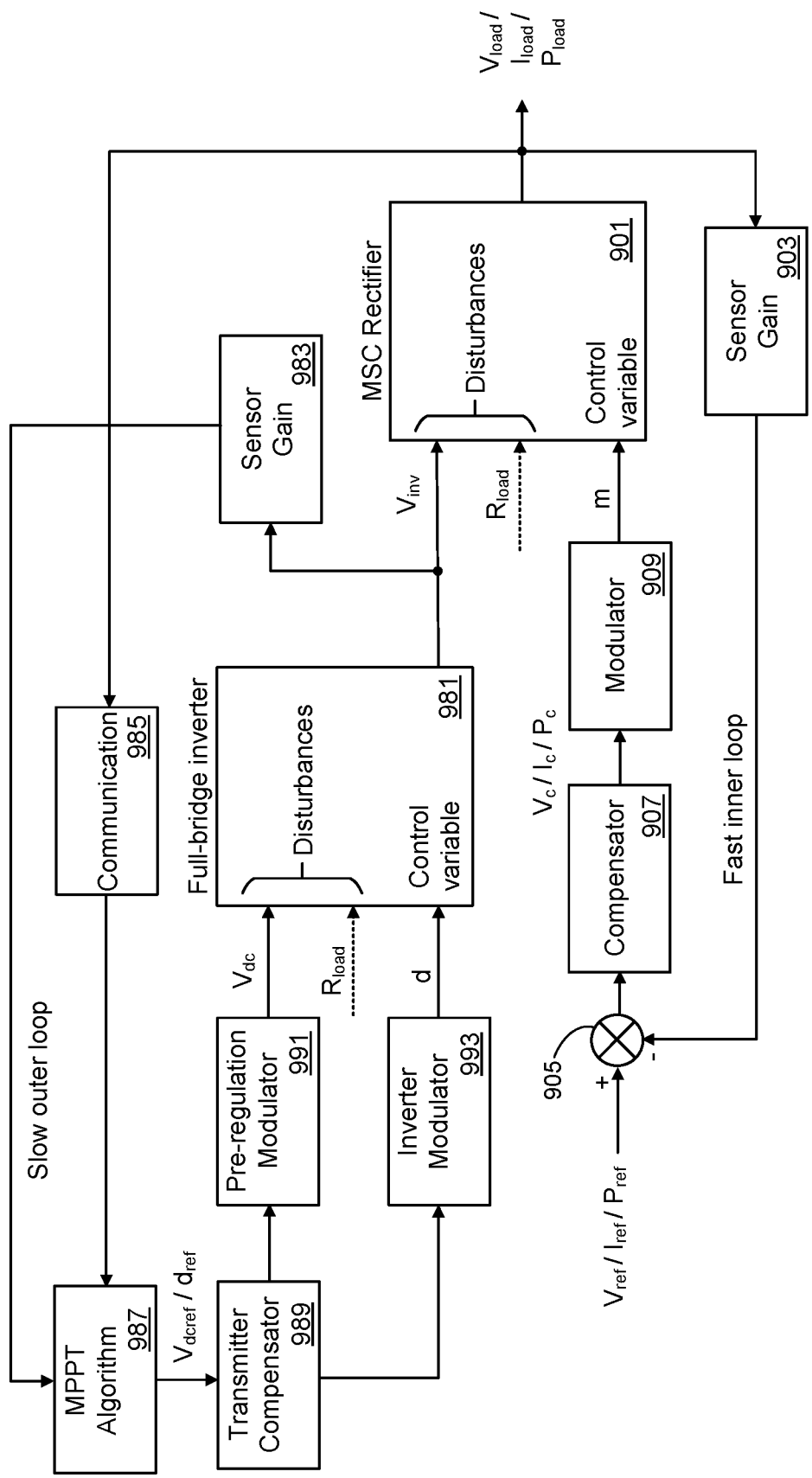
FIG. 9 illustrates an embodiment using a two-loop control strategy for the WPT system of FIG. 3.
Figure 10:
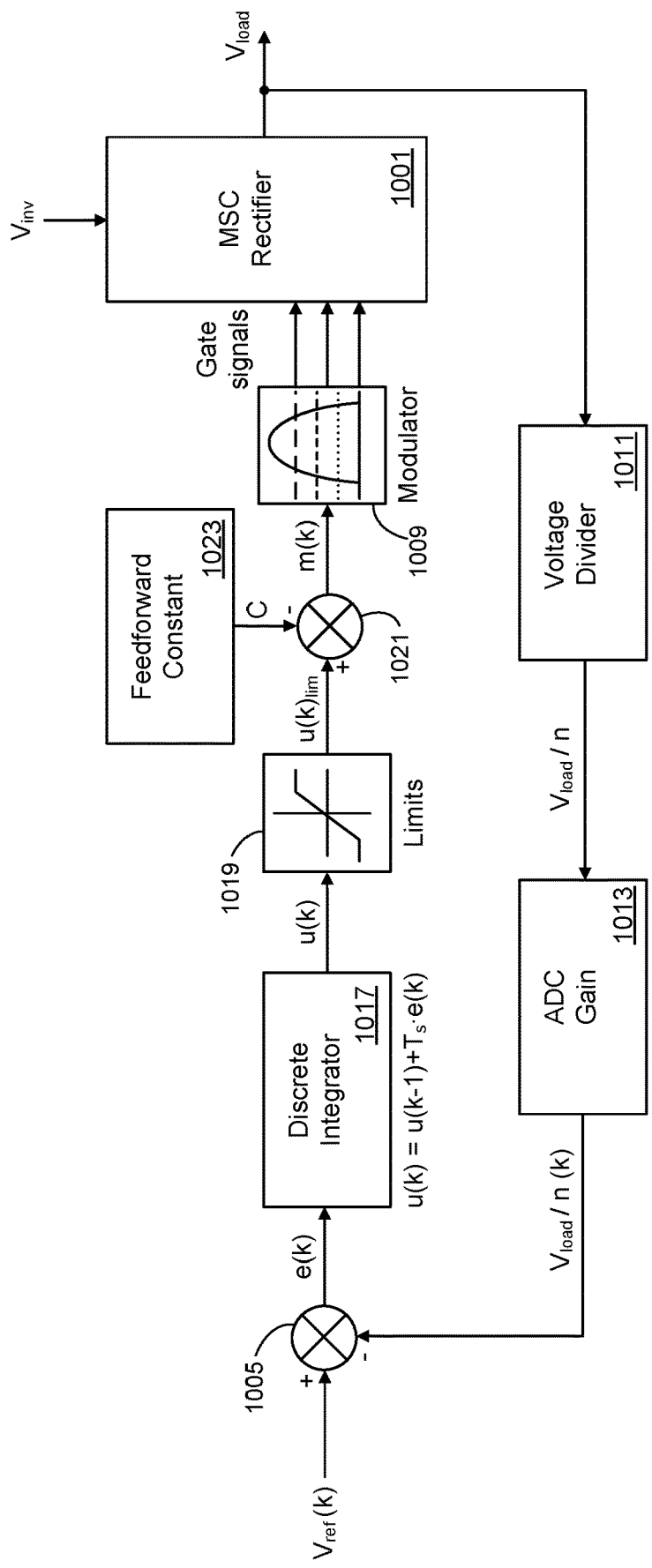
FIG. 10 provides more details of an embodiment of a closed-loop design for an MSC rectifier.
Figure 11:
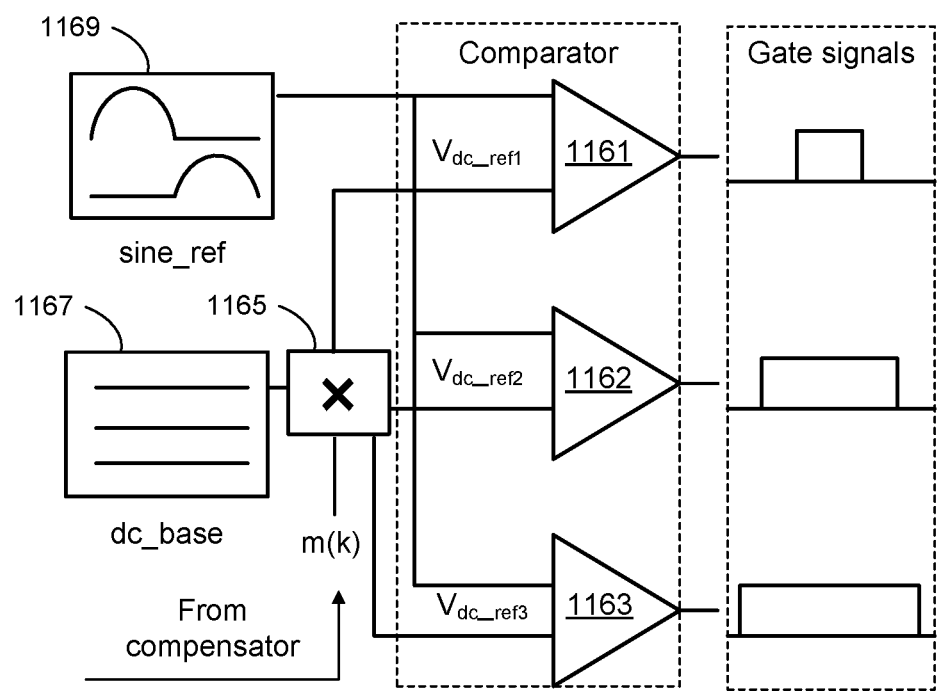
FIG. 11 illustrates the generation of the gate signals as output from three digital comparators, where the inputs are a half sinusoidal reference and DC voltage references.

As discussed further with respect to FIGS. 9-11, the timings for these signals are generated by the comparison of a set of DC reference values with a reference waveform, where here the reference waveform is a half cycle of a reference sine wave $V_{sine\_ref}$. The modulated DC references, $V_{dc\_refx}$, where x=1, 2, 3 for the 7-level example and, more generally, 1-N for a (2N+1)-level embodiment, are the product of a set of DC base values, $V_{dc\_basex}$, and a digitalized modulation index m(k). In the shown embodiment, the three DC base values just gap values: e.g. $V_{base2}=2V_{base1}$, $V_{base3}=3V_{base1}$, resulting in different duty cycles for each module. As illustrated, the high side switch's control signal is asserted, and the low side switch's control signal de-asserted with the corresponding $V_{dc\_refx}$ equals $V_{sine\_ref}$. The resultant multi-level waveform is illustrated by the heavier weighted line. Note that if the value of modulation index m(k) is sufficiently large, $V_{dc\_ref3}$ will exceed the maximum of $V_{sine\_ref}$, so that the wave form will degenerate into a 5-level waveform.

Note that a programmed Pulse Width Modulation (PWM) modulation scheme can be used as well, targeting on the low-order harmonic elimination. The modulation scheme in FIG. 4 is carrier-based modulation, where low-order harmonics exist in the spectrum. However, the harmonic content in a multilevel staircase waveform is still low compared with a square waveform. Therefore, the carrier-based PWM can be employed due to its simple implementation for a closed-loop control.

Figure 6A:
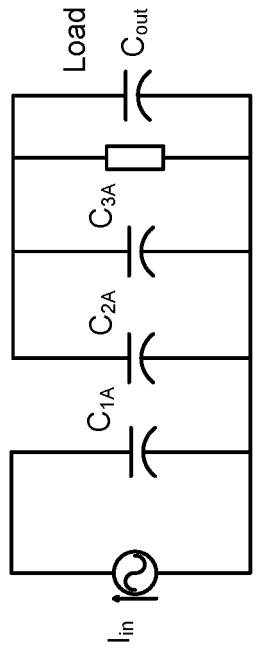
FIGS. 6A-6D illustrates the equivalent circuits of the 7-level SC rectifier in the embodiment of FIG. 4 during switching subintervals in one half-cycle.
Figure 6B:
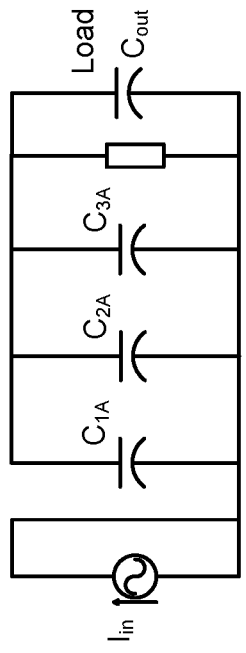
Figure 6C:
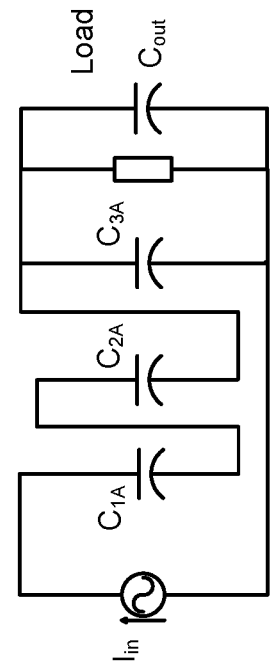
Figure 6D:
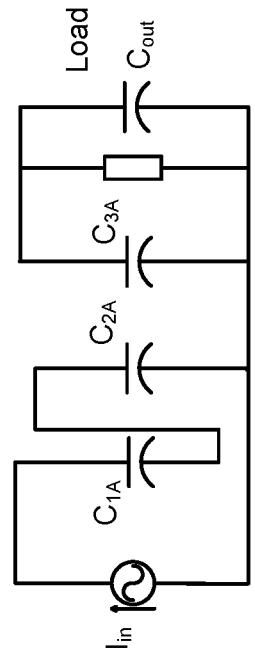

FIGS. 6A-6D illustrates the equivalent circuits of the 7-level SC rectifier in the embodiment of FIG. 4 during a sequence of switching subintervals in one half-cycle. For steady-state analysis, the input to the rectifier is approximated with a sinusoidal current source, $I_{in}$. The MSC switching pattern is quarter-wave symmetric with 7 subintervals per input half-cycle. The operation sequence in one half-cycle is: Subinterval 1→Subinterval 2→Subinterval 3→Subinterval 4→Subinterval 3→Subinterval 2→Subinterval 1, where FIG. 6A illustrates Subinterval 1, FIG. 6B illustrates Subinterval 2, FIG. 6C illustrates Subinterval 3, and FIG. 6D illustrates Subinterval 4.

In Subinterval 1, the input voltage of the rectifier is 0V, and all low-side switches $S_{xxL}$ conduct to provide a return path for the input current. All flying capacitors, $C_{1A}$-$C_{3A}$, are connected in parallel with the output, discharging to the load, as shown in FIG. 6A. In subinterval 2 (FIG. 6B), $C_{1A}$ is charged by the input current, and the input voltage is equal to the load voltage $V_{load}$. By switching additional flying capacitors in series with the input, the rectifier can generate an input of 2 $V_{load}$ in FIG. 6C, or 3 $V_{load}$ in FIG. 6D.

Because the bottom module with $C_{3A}$ is directly shorted to the output capacitor $C_{out}$, the voltage of $C_{3A}$ is always the output voltage, $V_{load}$. As such, $C_{3A}$ (and $C_{3B}$) can be combined with $C_{out}$ and implemented as a single component as long as layout permits doing so without adversely affecting charging loops. Flying capacitors $C_{1A}$ and $C_{2A}$ are periodically shorted to the output by switching $S_{C1A}$ and $S_{C2A}$, respectively, at the instance $t_5$ and $t_6$, as shown in FIG. 5. For the opposite half-cycle, Phase Leg A stays in subinterval 1 where all flying capacitor clamped to the output DC, while the Phase Leg B operates in the same manner with 180° phase shift to provide the negative half-cycle of $V_{rec}$. In a full period, this MSC rectifier generates a 7-level staircase voltage $V_{rec}$ at the input terminal, with the peak value max($V_{rec}$)=3 $V_{load}$. By stacking more modules, the MSC can achieve a higher voltage step-down ratio. This scalability facilitates accommodating different voltage and power rating, with reduced harmonic content. However, more switching devices and flying capacitors are required, which may contribute to higher conduction and switching loss.

FIGS. 7A-7C rectifier input waveforms and gate signals at various modulation indices, respectively illustrating examples of m=2, m=3.06, and m=3.5. FIGS. 7A-7C are arranged as FIG. 5, but to simplify the presentation only $S_{3AH}$, $S_{2AH}$, and $S_{1AH}$ are shown. The other signals shown in FIG. 5 (only $S_{3AH}$, $S_{2AH}$, $S_{1AH}$ only $S_{C1A}$, and $S_{C2A}$) will be related similarly as illustrated in FIG. 5 (i.e., $S_{3AH}$ is non-overlapping with $S_{3AH}$ and $S_{C1A}$, and so on). Again, only the first half-cycle is shown.

As shown in in the examples of FIGS. 7A-7C, rectifier input waveforms at different modulation index of the 7-level MSC rectifier shown in FIG. 4 are depicted. As can be seen, the stepped wave forms are the input waveforms of the MSC rectifier. Like shown in FIG. 5, the input waveforms are staircase shaped. The output voltage of the rectifier $V_{load}$ is equal to one "step" of the staircase waveform. The fundamental components of the input waveform $V_{rec}$(fund) is the sinusoidal waveform, and the corresponding gate signals are depicted respectively below the Vac waveforms. As the timing of gate signals changes for the switches in the MSC rectifier, $V_{AC}$ waveforms changes from 5 level staircase waveform of FIG. 7A to the 7 level staircase waveform of FIG. 7B, then to 7 level staircase waveform with steeper slopes of FIG. 7C. Correspondingly the fundamental signal amplitude $V_{rect(fund)}$ increases, as a result, the ratio between the amplitude of $V_{rect(fund)}$ and $V_{load}$ increases from 2 to 3.5 accordingly, as denoted by the modulation index m. FIG. 7A-7C demonstrates that the modulation index m can be changed by changing the timing of the gate signals, correspondingly, the resulted ratio in input fundamental voltage and output voltage is changed.

Figure 8:
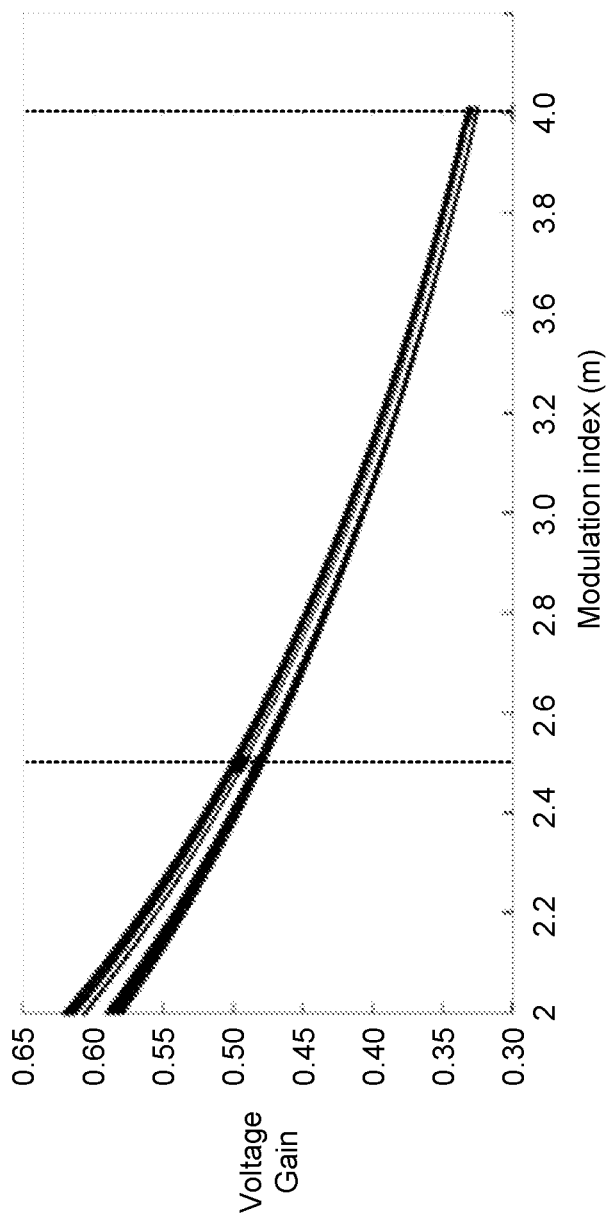
FIG. 8 summarizes an example of relationship between input and output voltage.

FIG. 8 summarizes an example of relationship between input and output voltage, where the voltage gain is defined as the ratio of input DC voltage $V_{dc}$ and output DC voltage $V_{load}$ of a wireless power transfer system with MSC rectifier as shown in FIG. 3. As can be seen, as the modulation index increases, the voltage gain decreases continuously, which indicates that with change of modulation index m through adjusting the switching timings, for the same input voltage $V_{dc}$, a different output voltage $V_{load}$ could be generated. Similarly, for the same output voltage $V_{load}$, a different input voltage $V_{dc}$ could be the input at the source. This flexibility in the voltage gain allows the system to regulate its output in a speedy manner to cope with changes applied to the system shown in FIG. 3. The adjustment of switching timing could be realized in a variety of ways, one of which is the carrier based PWM (pulse width modulation) method, the details of which is shown in FIG. 11.

As also illustrated by FIG. 8 by the width of the voltage gain to modulation index curve, the relationship between modulation index and voltage gain depends on the load condition, as a result a closed loop control system is required in order to realize the intended output regulation. It is also worth noting that for the example MSC rectifier shown in FIG. 4, the highest modulation index achievable is ~3.81, which corresponding to ⅓ in voltage gain, at which point the input AC waveform changes to a square wave. While at modulation index m~=2.5, the AC waveform best emulate a sine wave which generates the least $3^{rd}$ and $5^{th}$ order harmonic contents.

FIG. 9 illustrates an embodiment using a two-loop control strategy for the WPT system of FIG. 3 that can used to generate the control signals of FIG. 5, where the block diagram shown in FIG. 9 is one example of a number of possible embodiments. In general, the WPT system featuring the MSC rectifier 901 can also use, but is not limited to the transmitter-side control, receiver-side control and other combination of different control strategies. In FIG. 9, the MSC rectifier 901 can correspond to the MSC rectifier 301 of FIG. 3 and the full-bridge inverter 981 can be implemented as illustrated by the switches 391, 393, 395, and 397 of FIG. 3.

On the receiver side, the MSC rectifier 901 can regulate the output on the load to the desired operating point based on voltage ($V_{load}$), current ($I_{load}$), or power ($P_{load}$), according to battery charging requirements. The initial input voltage $V_{inv}$ should provide the desired output within the regulation boundary of the MSC rectifier 901. An inner fast loop on the receiver can maintain the desired output in response to the disturbances when the input voltage $V_{inv}$, or the load $R_{load}$ changes, where the load change input is represented by the broken arrow as the $R_{load}$ value is a not direct input but feeds back by measurement of the output of MSC rectifier 901. The inner fast loop generates a parameter, or modulation index m, to regulate the output of the MSC rectifier 901.

In the embodiment illustrated in FIG. 9, the fast inner loop on the WPT is shown to include sensor of gain 903 connected receive the output of the MSC rectifier 901 in terms of voltage ($V_{load}$), current ($I_{load}$), or power ($P_{load}$), and provides an indication of the gain to be compared at 905 by determining a difference between the output of the MSC rectifier 901 a reference voltage ($V_{ref}$), reference current ($I_{ref}$), or reference power ($P_{ref}$). Based on the difference, a compensator 907 can generate a compensation voltage ($V_c$), current ($I_c$), or power ($P_c$), from which a modulator 909 can generate a modulation index m to act as a control variable for regulation of the MSC rectifier 901.

More detail for an embodiment of the fast inner loop is described with respect to FIG. 10. The output of the MSC rectifier 901 can also be communicated back to the WPT transmitter by way of communication link 985, such as by way of the in-band communication link of the Qi standard, for use in regulation on the WPT transmitter side.

Continuing with FIG. 9 and the regulation elements on the transmitter side, in addition to the full-bridge inverter 981 of the shown embodiment is a slow outer control loop. The disturbances as seen by the inverter 981 can include variations in the received input voltage $V_{dc}$ and, again indirectly, changes in the load $R_{load}$ as communicated back by communication link 985. To regulate the outer loop, the inverter 981 can receive a control variable d, such as a value for the duty cycle of the waveforms controlling the inverter's switches.

In the transmitter's slow outer loop, a senor 983 for the gain of the inverter 981 can used along with the information from the communication link 985 as inputs for an algorithm, such as a Maximum Power Point Tracking (MPPT) algorithm 987, to determine reference values $V_{dcref}$, $d_{ref}$ for the voltage and control variable inputs $V_{dc}$, d of the inverter 981. A transmitter compensator 989 can receive and, if needed, compensate these values and provide them to a pre-regulation modulator 991 and an inverter modulator 993 to respectively supply $V_{dc}$ and d to the inverter 981. The inverter 981 changes its input voltage $V_{dc}$ according to the MPPT algorithm to move the system to a high-efficiency point. In general, a higher system efficiency is achieved when the MSC rectifier is operating with a higher modulation index, which can be achieved by adjusting the inverter 981 input voltage $V_{dc}$ through the MPPT algorithm. The outer slow loop is controlled on the transmitter side and is responsible for the optimal efficiency tracking within the regulation boundary.

FIG. 10 provides more details of an embodiment of a closed-loop design for an MSC rectifier. The closed-loop controller for the MSC rectifier 1001 is designed to regulate the output voltage, current or the output power to desired points when disturbances occur, such as a change of the input voltage or the load. Note that the control block shown in FIG. 10 is just one example for the output regulation of the MSC rectifier 1001. The MSC rectifier 1001 can also use, but is not limited to open-loop control, feed-forward control and other combinations of control strategies to regulate the MSC rectifier's output. A general principle of the MSC rectifier regulation embodiments described here is to use the modulation index m to regulate the output voltage/current/power.

For voltage based regulation, the goal is to maintain a constant output DC voltage $V_{load}$ when the input voltage $V_{inv}$ or the load $R_{load}$ changes. As a result, a proportional-integration (PI) type compensator is employed as an example embodiment. The integrator 1017 provides an infinite DC gain so that the output voltage $V_{load}$ can track the reference value $V_{ref}$ with a minimal error. A proportional gain can reduce the response time.

The block diagram of the single-integrator type compensator is shown in FIG. 10 for an embodiment with the regulation based on the output voltage level $V_{load}$. The output voltage $V_{load}$ of the MSC rectifier 1001 is sensed via a voltage divider 1011 to generate $V_{load}/n$ for a division factor of n and is digitalized to $V_{load}/n$ (k) by a gain ADC 1013 in the digital controller. The error e(k) determined in the comparator or difference circuit 1005 is the difference between the sensed load voltage and the reference voltage $V_{ref}$. A digital, or discrete, integrator 1017 is designed as $$u(k)=u(k-1)+T_s \cdot e(k),$$

where the u(k) is the output value of the integrator, u(k−1) is the last value and $T_s$ is the sampling period.

A saturation block 1019 is placed after the digital integrator 1017, which limits a maximum and a minimum output value if the integration exceeds the thresholds. This limited value $u(k)_{lim}$ prevents the overflow of the accumulator. A feedforward constant C at block 1023 is used to accelerate the compensator 1021 to the desired value m(k) for the modulation index based on a difference or comparison of $u(k)_{lim}$ with the acceleration constant C. The output of the compensator 1021 is the modulation index m(k) and is sent to the modulator 809 to generate gate signals for the MSC rectifier, as described below with respect to FIG. 5.

FIG. 11 illustrates one embodiment for implementing the modulation circuit 809 of FIG. 8. The DC base values are generated at the dc_base block 1167. In one embodiment, these base values can just be gap values ($V_{base2}=2V_{base1}$, $V_{base3}=3V_{base1}$) based on a band-gap device, for example. The base DC reference values, along with the modulation index m(k) from the compensator, are received at the multiplier 1165 and multiplied to provide the modulated DC reference values $V_{dc\_ref1}$, $V_{dc\_ref2}$, and $V_{dc\_ref3}$. Each of the DC reference values is provided at an input to a corresponding one of the comparators 1161, 1162, and 1163. The comparators 1161, 1162, and 1163 also receive a reference waveform from sine_ref generator 1169 as a second input, where a half cycle of a reference sine waveform is used in the shown embodiment, a positive half cycle being used in the first half cycle for the signals of phase leg A and a positive half cycle being used in the second half cycle for the signals of phase leg B.

Figure 12:
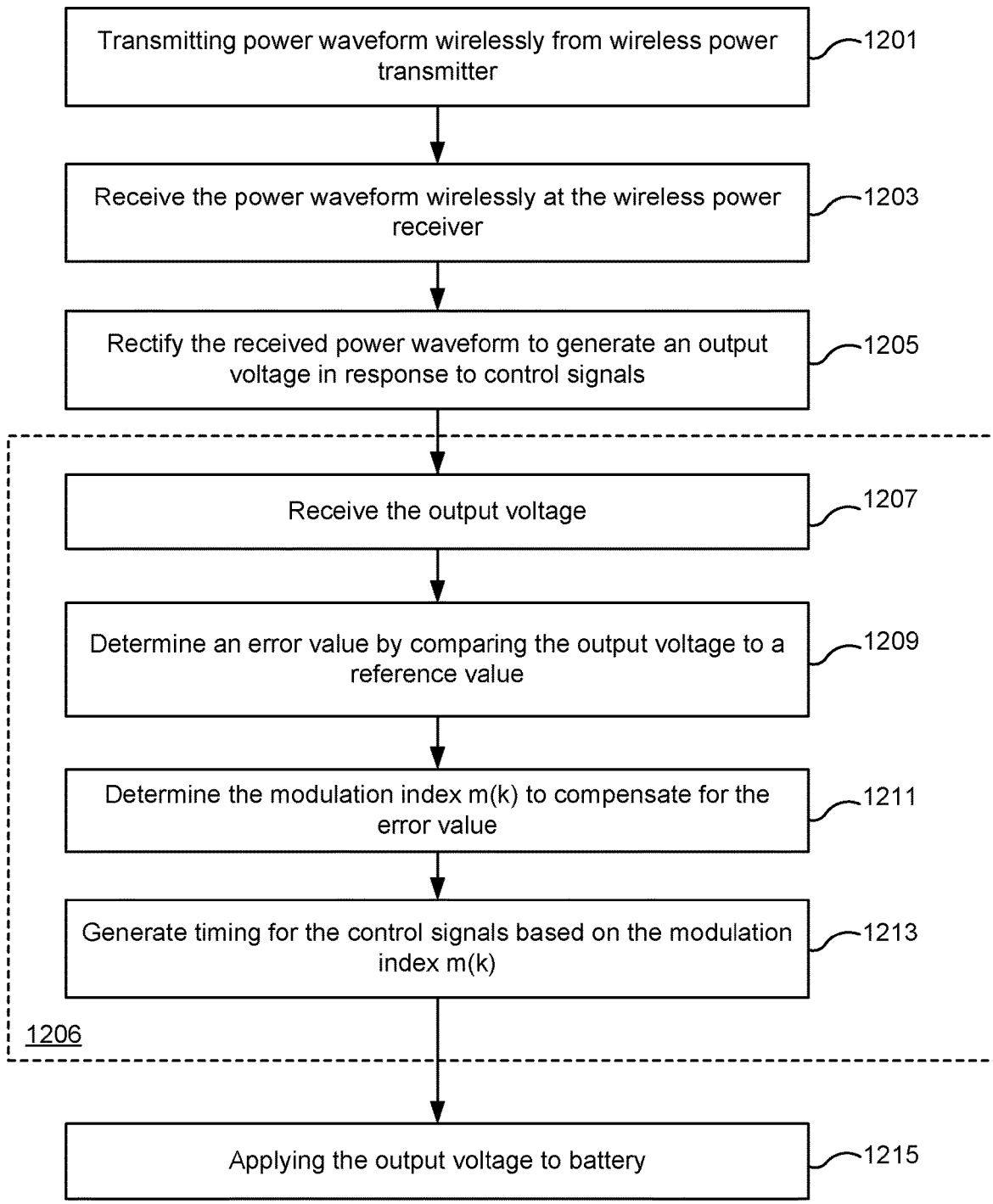
FIG. 12 is a flowchart of one embodiment of a process of operating and regulating a multilevel switched-capacitor rectifier.

FIG. 12 is a flowchart of one embodiment of a process of operating and regulating a multilevel switched-capacitor rectifier to rectify a received power waveform to generate an output voltage in response to a plurality of control signals. Beginning at 1201, a wireless power transmitter, such as 122 of FIG. 1, transmits power wireless to a wireless power receiver, such as 142 of FIG. 1, where it is received at 1203. For example, referring to FIG. 3, the power can be transmitted from the coil 383 on the transmitter side to the coil 373 on the receiver side. At 1205 the MSC rectifier 301 rectifies the received power waveform to generate its output voltage in response to a set of control signals, which are generated at 1206, that can be applied to the switches of the MSC rectifier, such as those illustrate in the embodiment of FIG. 4.

More detail on 1206 is given with respect to 1207, 1209, 1211, and 1213. At 1207, the output voltage is received, such as receiving $V_{out}$ at the voltage divider 811 of FIG. 8. At 1209, this output voltage is compared to a reference value, such as to $V_{ref}$ at the comparator or difference element 805, to determine an error value e(k) that can then be used to determine modulation index m(k). At 1211 the modulation index m(k) to compensate for the error value is determined. For example, the DC reference voltage levels, such as the base DC reference values $V_{dc\_base1}$, $V_{dc\_base2}$, and $V_{dc\_base3}$ for the embodiment of FIGS. 5 and 11, are received, and from these the modulated DC reference values $V_{dc\_ref1}$, $V_{dc\_ref2}$, and $V_{dc\_ref3}$ are generated. As illustrated in FIGS. 5 and 11, the modulated DC reference values can be generated by multiplying base DC reference values $V_{dc\_ref1}$, $V_{dc\_ref2}$, and $V_{dc\_ref3}$ by the modulation index m(k), which is in turn derived from the error value e(k).

The timing for the control signals is generated based on the modulation index m(k) at 1213. For example, in embodiments described above the reference waveform, such as the reference sine waveform of FIGS. 5 and 11, is compared with the modulated DC reference voltages to generate the timing for the control signals for the rectifier. The generated output voltage can then be applied to the battery or other load at 1215.

The embodiments of a multi-level switched capacitor rectifier with output regulation using the described closed-loop control can regulate the output voltage over a wide load change and for input voltage changes. For battery charging applications, the output voltage should change the reference value according to the state of charge of the battery. The closed-loop control mechanism provides the output regulation ability for the input change, the load change and the reference change with the MSC rectifier, providing dynamic performance acceptable for battery charging applications.

As also mentioned above, another benefit of the using the described embodiment of a regulated MSC rectifier is reduced harmonic content in the WPT receiver. Compared with the two level converter of a full bridge rectifier, the multilevel converter can generate low total harmonic distortion (THD), and near-sinusoidal voltages with a switching frequency equal to the output waveform fundamental frequency. Particularly, selective harmonic elimination (SHE) can nullify a range of low-order harmonics such as the 3rd and 5th with a programmed switching pattern, reducing the filtering requirements for the receiver implementation. This feature reduces size for space-demanding applications and facilitates compliance with the bandwidth requirements and EMI standards in the WPT applications.

Figure 13A:
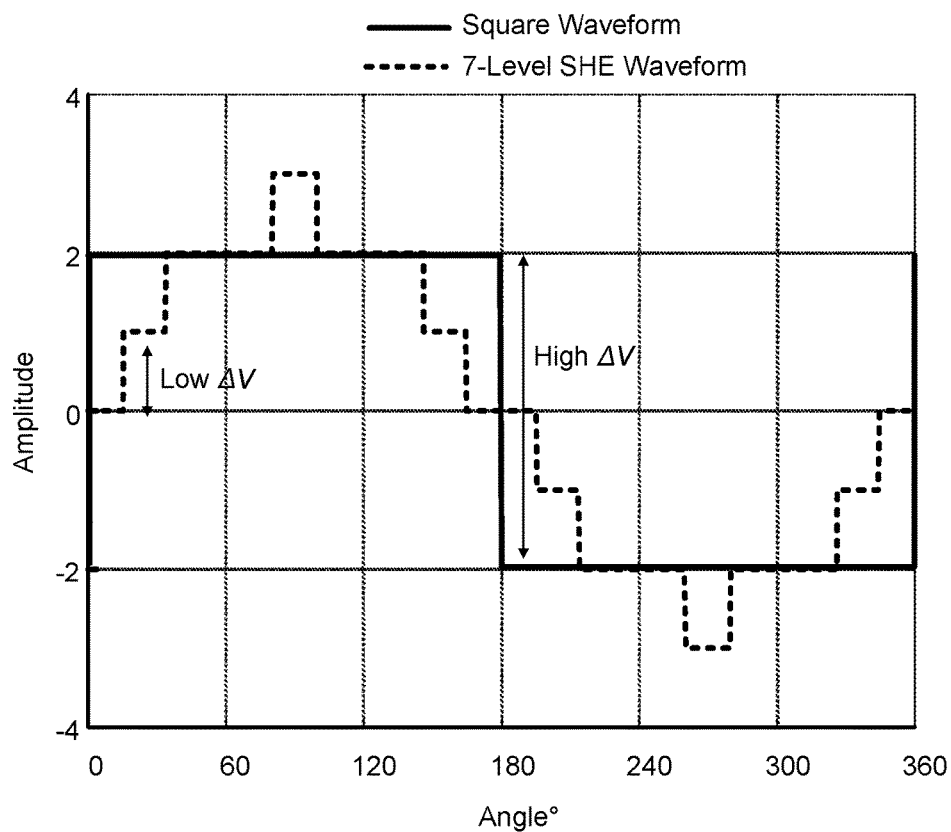
FIGS. 13A and 13B illustrate the reduction in low order harmonics of a multilevel waveform relative to a stand square waveform.
Figure 13B:
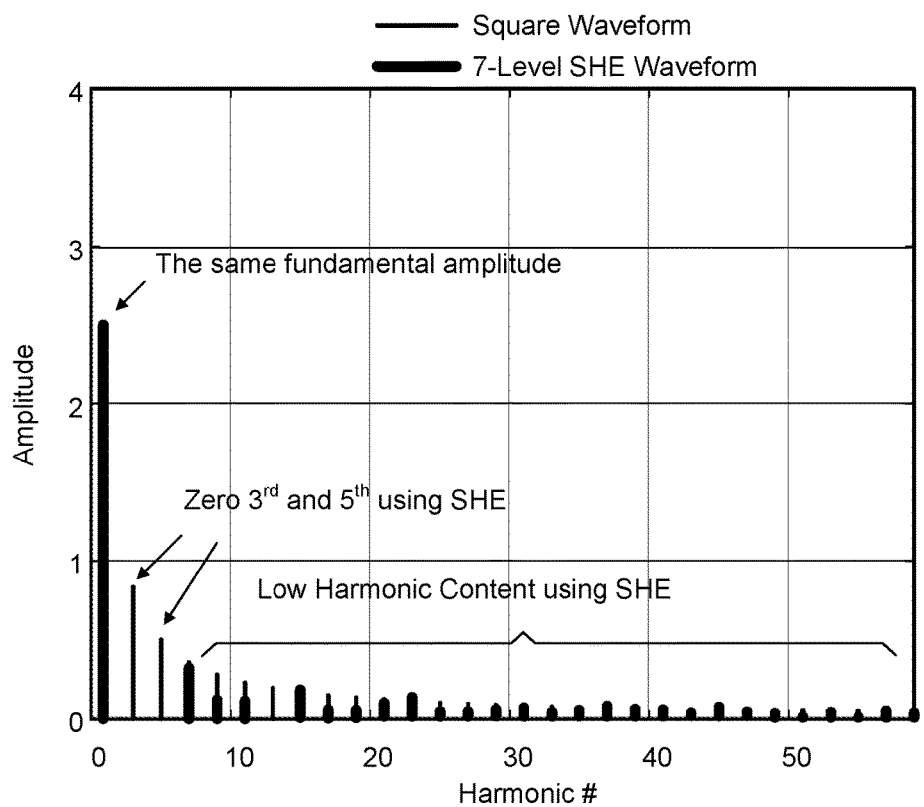

FIGS. 13A and 13B illustrate the reduction in low order harmonic when using a multilevel waveform relative to the two-level waveform from a full bridge rectifier. FIG. 13A shows a time domain 7 level waveforms and square waveform over one cycle. As illustrated on the figure, the voltage steps size $\Delta V$ between levels is lower for the 7-level waveform than for the square waveform. FIG. 13B looks at the spectrum of the 7-level staircase waveform using SHE compared with a two-level square waveform with the same fundamental magnitude. The multilevel SHE waveform has zero 3rd and 5th harmonics resulting in a substantial decrease in total harmonic content.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for regulating a multilevel switched-capacitor (MSC) rectifier circuit, comprising:
    a compensator configured to receive a comparison of an output of the MSC rectifier circuit with a reference level and generate a modulation index from the comparison; and
    a modulator configured to:
        receive the modulation index;
        generate timings for a plurality of control signals of switches in the MSC rectifier circuit corresponding to a modulation index from one or more reference voltage levels and a reference waveform;
        generate a plurality of modulated direct current (DC) voltage levels from the modulation index and the one or more reference voltages; and
        generate the corresponding plurality of control signals by a comparison of the modulated DC voltage levels and the reference waveform.

2. The apparatus of claim 1, further comprising:
    a gain sensor configured to receive the output of the MSC rectifier circuit and generate therefrom an indication of an output level; and
    a comparator configured to receive the indication of the output level and the reference level and generate an error value from a difference between the indication of the output level and the one or more reference levels, wherein the compensator includes:
        an integrator configured to receive the error value and generate therefrom the modulation index as an accumulated error value.

3. The apparatus of claim 2, wherein the modulated DC voltage levels have amplitudes dependent upon the accumulated error value.

4. The apparatus of claim 2, further comprising:
    a limiter configured to receive and limit a range of the accumulated error value and to supply the error value to the modulator as a range limited accumulated error value.

5. The apparatus of claim 2, further comprising:
    a feedforward circuit configured to receive the accumulated error value and a feedforward parameter and provide the error value to the modulator as an accelerated accumulated error value.

6. The apparatus claim 2, wherein the gain sensor is configured to receive the output of the MSC rectifier circuit as an output voltage level.

7. The apparatus of claim 6, wherein the gain sensor includes:
    a voltage divider configured to receive and divide the output voltage level; and
    an analog to digital converter configured to receive the divided output voltage level and supply the indication of the output level as a digital value.

8. The apparatus of claim 1, wherein the reference waveform is a reference sine wave, and
    wherein the modulator is configured to generate a timing of each of the control signals by comparison of an amplitude of the corresponding modulated DC voltage level with the reference sine wave.

9. The apparatus of claim 8, the modulator comprising:
    a plurality of comparators each figured to receive the reference sine wave and a corresponding one of the corresponding modulated DC voltage levels and to provide one of the control signals as an output of the corresponding comparator.

10. A method for wirelessly receiving power, comprising:
    rectifying a received power waveform using a multilevel switched-capacitor (MSC) rectifier to generate an output voltage in response to a plurality of control signals; and
    generating the plurality of control signals, comprising:
        receiving the output voltage;
        performing a comparison of the output voltage to a reference value;
        generating a modulation index based on the comparison;
        receiving one or more direct current (DC) reference voltage levels;
        generating a plurality of modulated DC reference voltages from the modulation index and the DC reference voltage levels;
        receiving a reference waveform; and
        generating a timing for each of the plurality of control signals by comparing a corresponding one of the modulated DC reference voltages with the reference waveform.

11. The method of claim 10, further comprising:
    receiving the power waveform wirelessly at a wireless power receiver of a receiver circuit from a wireless power transmitter of a transmitter circuit.

12. The method claim 10, further comprising:
  determining an error value from the comparison, where the plurality of modulated DC reference voltages are generated from the error value and the DC reference voltage levels.

13. The method of claim 12, wherein determining the error value comprises:
  converting the output voltage to a digital value;
  comparing the digital value of the output voltage to the reference value; and
  integrating results of the comparing of the digital value of the output voltage to the reference value to determine the error value.

14. The method of claim 13, wherein determining the error value further comprises:
  limiting a range of values of the integrated results of the comparing of the digital value of the output voltage to the reference value to determine the error value.

15. The method of claim 13, wherein determining the error value further comprises:
  receiving a feedforward parameter; and
  combing the integrated results of the comparing of the digital value of the output voltage to the reference value with the feedforward parameter.

16. The method of claim 10, wherein the reference waveform is a reference sine wave and generating a timing for each of the plurality of control signals comprises:
  comparing an amplitude of the corresponding modulated DC reference voltage level with an amplitude of the reference sine wave.

17. A regulated rectifier system comprising:
  a multilevel switched-capacitor (MSC) rectifier circuit configured to receive an input waveform and a plurality of control signals and to generate an output for driving a load from the input waveform in response to the plurality of control signals; and
  a regulation circuit configured to:
    receive the output of the rectifier circuit;
    determine a modulation index from a comparison of the output of the rectifier circuit with a reference level, generate a corresponding plurality of the control signals from the modulation index;
    generate a plurality of modulated voltage levels from the modulation index; and
    generate the corresponding plurality of the control signals by a comparison of the modulated voltage levels and a reference waveform, and
  wherein the regulation circuit comprises:
    a compensator configured to receive the comparison of the output of the rectifier circuit with the reference level and generate the modulation index from the comparison; and
    a modulator configured to receive the modulation index, one or more reference voltage levels and a reference waveform and configured to generate the plurality of modulated voltage levels from the modulation index and the one or more reference voltage levels, and to generate the corresponding plurality of the control signals by the comparison of the modulated voltage levels and the reference waveform.

* * * * *